US012603796B2

(12) United States Patent
Rao Ganesh et al.

(10) Patent No.: US 12,603,796 B2
(45) Date of Patent: Apr. 14, 2026

(54) RULE MODIFICATION AT AN AUTOMATION SYSTEM

(71) Applicant: KONINKLIJKE PHILIPS N.V., Eindhoven (NL)

(72) Inventors: Ramachandra Rao Ganesh, Groningen (NL); Andrii Semenov, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/293,429

(22) PCT Filed: Jul. 29, 2022

(86) PCT No.: PCT/EP2022/071369
§ 371 (c)(1),
(2) Date: Jan. 30, 2024

(87) PCT Pub. No.: WO2023/012063
PCT Pub. Date: Feb. 9, 2023

(65) Prior Publication Data
US 2024/0333549 A1 Oct. 3, 2024

(30) Foreign Application Priority Data
Aug. 3, 2021 (EP) .................................... 21189414

(51) Int. Cl.
*H04L 12/28* (2006.01)
*G10L 15/22* (2006.01)

(52) U.S. Cl.
CPC ........ *H04L 12/282* (2013.01); *H04L 12/2829* (2013.01)

(58) Field of Classification Search
CPC ............... H04L 12/282; H04L 12/2829; G10L 2015/223; G10L 15/22
See application file for complete search history.

(56) References Cited

U.S. PATENT DOCUMENTS 6,192,282 B1    2/2001  Smith et al.
9,230,560 B2    1/2016  Ehsani et al.
                        (Continued)

OTHER PUBLICATIONS

Yoo et al., "Dynamic Rule Modification Method for a Light-weight Rule Engine", IJISET—International Journal of Innovative Science, Engineering & Technology, vol. 2 Issue 11, Nov. 2015, pp. 348-353.
                        (Continued)

*Primary Examiner* — Kamal M Hossain

(57) ABSTRACT

According to an aspect, there is provided a computer-implemented method for modifying a rule at a control hub, wherein the control hub is connected to one or more devices and is configured to deliver at least one of audio and/or visual information. The method comprises: acquiring (210) a base routine rule layer for controlling the devices in a usage scenario, wherein the base routine rule layer is based on historical data associated with a routine of a user; acquiring (220) sensor data and/or device data from at least one of the one or more devices; determining (230) whether there is an interfering event based on evaluation of the sensor data and/or device data, wherein the interfering event conflicts with the base routine rule layer; generating (240), upon determining that there is an interfering event, an additional routine rule layer based on the sensor data and/or device data; executing the additional routine rule layer; and storing the additional routine rule layer in a rule database at the control hub.

15 Claims, 6 Drawing Sheets

(56) References Cited

U.S. PATENT DOCUMENTS

| | | | |
|---|---|---|---|
| 10,496,050 B2 | 12/2019 | Marti et al. | |
| 10,841,122 B1 | 11/2020 | Jensen et al. | |
| 2016/0070251 A1 | 3/2016 | Brown et al. | |
| 2016/0091872 A1* | 3/2016 | Marti ................... | H04L 67/535 |
| | | | 700/275 |
| 2016/0248847 A1 | 8/2016 | Saxena et al. | |
| 2020/0076898 A1* | 3/2020 | Shukla ................. | H04L 67/125 |
| 2021/0234723 A1* | 7/2021 | Madden ............... | H04L 12/282 |
| 2022/0256760 A1* | 8/2022 | Anderson .............. | A01B 49/06 |
| 2022/0395232 A1* | 12/2022 | Locke ................... | A61H 9/005 |
| 2023/0024793 A1* | 1/2023 | Isogai ............... | A61B 5/02055 |

OTHER PUBLICATIONS

Kumar et al., "Context Based Adaption of Semantic Rules in Smart Buildings", Information Integration and Web-Based Application and Services, ACM, Dec. 2, 2013, pp. 719-728.
Sultan et al., "SLASH: Self-learning and adaptive smart home framework by integrating IoT with big data analytics" 2017 Computing Conference, IEEE, Jul. 18, 2017, pp. 530-538; in particular section III.; p. 534, left-hand coloumn-p. 536, left-hand column.
Ricquebourg et al., "Context Inferring in the Smart Home: An SWRL Approach", Advanced Information Networking and Applications Workshops, 2007, Ainaw '07. 21st International Conference on, IEEE, May 21, 2007, pp. 290-295.
International Search report and Written Opinion of PCT/EP2022/071369, dated Nov. 24, 2022.

\* cited by examiner

RULE MODIFICATION AT AN AUTOMATION SYSTEM

CROSS-REFERENCE TO PRIOR APPLICATIONS

This application is the U.S. National Phase application under 35 U.S.C. § 371 of International Application No. PCT/EP2022/071369, filed on Jul. 29, 2022, which claims the benefit of European Patent Application No. 21189414.2, filed on Aug. 3, 2021. These applications are hereby incorporated by reference herein.

FIELD OF THE INVENTION

The present disclosure relates to a method for modifying a rule at a control hub connected to one or more devices, and a control hub having rule modification capabilities.

BACKGROUND OF THE INVENTION

Home automation systems and assistants such as voice-assisted (or voice-controlled) control hubs that interact with users through audio/voice input and output have grown in popularity alongside the growth of the Internet and cloud computing. These systems may be connected to a number of devices (e.g., an electric toothbrush) can provide an interface for providing various types of information including instructions for using the devices. Moreover, users can interact with entertainment devices (e.g., a TV, a streaming device, a game console, etc.) connected to a control hub by using utterances such as "turn on the living room TV" and "set the volume of the living room TV to twenty-five". The control hub includes an intelligent decision layer that fuses a plurality of sensor inputs from multiple appliances, processes the inputs based on predefined rules or thresholds, triggers a voice response in the backend (cloud), and delivers the specific event via an auxiliary device or an on-appliance user interface. This delivery of speech utterances may occur alone or in combination of display of appropriate information relevant to the event via various cognitive cues.

For example, the control hub can handle the administration of privileges for the appropriate voice response when multiple devices are in simultaneous use in a bathroom eco-system. FIG. 1 is a schematic diagram of a hub system comprising a hub layer and a network layer. The hub layer includes a control hub 110 connected to a speaker device 120 and a plurality of local connectivity devices 130, 140, and 150. The network layer includes a network 160 to which the hub 110 is connected, and the network 160 is also connected to a cloud-based service 170. The hub 110 together with the cloud-based service 170 is capable of receiving an order from a voice assistant device (not shown in the drawing) to change a parameter of a device (e.g., electric shaver). The hub 110 can act upon such intent and change the parameter of the device.

SUMMARY OF THE INVENTION

Voice-first user interfaces are different from screen interactions. For example, on the web or mobile, one might have a single user interface that dynamically surfaces personal content such as music preferences. In voice interactions, in addition to personal content, the interaction itself can be personalised. Voice-first interactions provide the possibility of creating individual user profiles. From a user experience perspective, the interactions should be predictable yet varied and delightful. In a multiple device scenario, this can be done by adapting existing rules (from historical usage) to create new rules and validating it by real time sensor data or device data.

There are a number of shortcomings associated with currently available automation and/or assistance systems, which are addressed by the embodiments proposed in the present disclosure.

According to a first specific aspect, there is provided a computer-implemented method for modifying a rule at a control hub. The control hub is connected to one or more devices and is configured to deliver at least one of audio information and visual information. The method comprises: acquiring a base routine rule layer for controlling the one or more devices in a usage scenario, wherein the base routine rule layer is based on historical data associated with a routine of a user; acquiring at least one of sensor data and device data from at least one of the one or more devices; determining whether there is an interfering event based on evaluation of the at least one of sensor data and device data, wherein the interfering event conflicts with the base routine rule layer; generating, upon determining that there is an interfering event, an additional routine rule layer based on the at least one of sensor data and device data, wherein the additional routine rule layer is for controlling the one or more devices in the usage scenario when the interfering event occurs; executing the additional routine rule layer; and storing the additional routine rule layer in a rule database at the control hub.

In some embodiments, acquiring the base routine rule layer for controlling the one or more devices may comprise: acquiring the historical data associated with the routine of the user at the at least one of the one or more devices; and generating the base routine rule layer based on the acquired historical data.

In some embodiments, the method further comprises: determining whether or not additionally acquired sensor data and/or device data is indicative of an occurrence of the interfering event subsequent to generating the additional routine rule layer; selecting, from the rule database, the base routine rule layer in response to a determination being made, based on the additionally acquired sensor data and/or device data, that the interfering event has not occurred subsequent to generating the additional routine rule layer; or selecting, from the rule database, the additional routine rule layer in response to a determination being made, based on the additionally acquired sensor data and/or device data, that the interfering event has occurred subsequent to generating the additional routine rule layer; and instructing the selected base or additional routine rule layer to be executed, to control the one or more devices according to the selected base or additional routine rule layer.

In some embodiments, subsequent to generating the additional routine rule layer, the method comprises: determining whether or not the additional routine rule layer still applies based on whether or not the interfering event occurs within a specified period of time; and deleting the additional routine rule layer from the rule database in response to determining that the interfering event has not occurred within the specified period of time.

In some embodiments, the method may further comprise acquiring a user interaction to confirm acceptance of the additional routine rule layer, wherein the step of executing the additional routine rule layer and storing the additional routine rule layer are only performed upon acquiring the user interaction to confirm acceptance of the additional routine rule layer.

In some embodiments where the control hub is connected to a plurality of devices, the base routine rule layer may dictate a first relative priority of usage of at least a subset of the plurality of devices, and the additional routine rule layer may dictate a second relative priority of usage of at least the subset of the plurality of devices to accommodate or circumvent the interfering event, wherein the second relative priority of usage is different from the first relative priority of usage.

In some embodiments where the control hub is connected to a plurality of devices, the base routine rule layer may dictate a first device of the plurality of devices for use in the usage scenario, and the additional routine rule layer may dictate a second device of the plurality of devices for use in the usage scenario to accommodate or circumvent the interfering event, wherein the second device is different from the first device.

In some embodiments, the base routine rule layer may dictate a first operation mode at a device of the one or more devices for use in the usage scenario, and the additional routine rule layer may dictate a second operation mode at the device for use in the usage scenario to accommodate or circumvent the interfering event, wherein the second operation mode is different from the first operation mode.

In some embodiments, the sensor data may comprise at least one of: time data of a device, motion sensor data of a device, accelerometer data of a device, rotation sensor data of a device, angle sensor data of a device, battery level data of a device, pressure sensor data of a device, stroke length sensor data of a device, stroke speed sensor data of a device, stroke density sensor of a device, touch sensor data of a device, pause sensor data of a device, distance sensor data of a device, grip sensor data of a device, hair density sensor data of a device, hair length sensor data of a device, environmental sensor data of a device, displacement sensor data of a device, operation sensor data of a device, skin hydration sensor of a device, skin oiliness sensor of a device, skin pH sensor data of a device, pulse sensor data of a device, image sensor data of a device, and attachment sensor data of a device.

In some embodiments, the device data may comprise at least one of: a battery level status of a device, a remaining time for an action corresponding to a device, a cleanliness status of a device, a wear status of a device, usage statistics associated with an accessory of a device, a revolutions per minute. RPM, at a device, a torque level of a device, an operation mode or function of a device, a connectivity status of a device, a time spent on a body zone of a device, and handling metrics of a device.

In some embodiments where the sensor data comprises at least one of skin hydration sensor data of a device and a skin oiliness sensor data of a device, the interfering event may be when a skin hydration level of the user or a skin oiliness level of the user breaches a predetermined threshold. In some embodiments where the sensor data comprises battery level data of a device and/or the device data comprises a battery level status of a device, the interfering event may be when the battery level of the device is lower than a predetermined threshold, or when the battery level of the device is lower than that of another device connected to the control hub.

In some embodiments where the device data comprises a cleanliness status of a device, the interfering event may be when the cleanliness status of the device is lower than a predetermined threshold.

In some embodiments, the one or more devices may comprise one or more of: an electric toothbrush, an electric shaver, an oral cleaning device, an interdental device, a haircare device, a hair removal device, a skincare device, a body grooming device, an epilator device, an intense pulse light, IPL, device, and a body trimming device.

According to second specific aspect, there is provided a computer program comprising a computer readable medium, the computer readable medium having computer readable code embodied therein, the computer readable code being configured such that, on execution by a suitable computer or processor, the computer or processor is caused to perform the method as described herein.

According to a third specific aspect, there is provided a control hub connected to one or more devices, the control hub comprising processing circuitry configured to deliver at least one of audio information and visual information, and to perform the following steps: acquire a base routine rule layer for controlling the one or more devices in a usage scenario, wherein the base routine rule layer is based on historical data associated with a routine of a user; acquire at least one of sensor data and device data from at least one of the one or more devices; determine whether there is an interfering event based on evaluation of the at least one of sensor data and device data, wherein the interfering event conflicts with the base routine rule layer; generate, upon determining that there is an interfering event, an additional routine rule layer based on the at least one of sensor data and device data, wherein the additional routine rule layer is for controlling the one or more devices in the usage scenario when the interfering event occurs; execute the additional routine rule layer; and store the additional routine rule layer in a rule database at the control hub.

These and other aspects will be apparent from and elucidated with reference to the embodiment(s) described hereinafter.

The proposed method and control hub of the present disclosure provide a number of technical advantages.

For example, the rule modification method and capability allow data streams (real time, current, and historical) from multiple devices to be combined and fused for building new rule layers via natural user interaction, thus increasing the user friendliness of the control hub by adapting to new scenarios and new interactions with users to provide a seamless and convenient service. Certain embodiments of the present disclosure allow priority assignment (and reassignment) of device usage based on real time sensor data and/or device data thus allowing users to complete their usual routines even when interfering events occur. Moreover, certain embodiments allow allocation of unique voice signatures as well as response via unique voice signatures per device and/or per user profile available in the connected system.

In some cases, a user of one or more devices may have a routine which means that the base routine rule layer always applies. However, another user of one or more devices may be associated with an interfering event, thereby resulting in an additional routine rule layer being generated for this user. The additional routine rule layer may improve personalization to the user. However, the base routine rule layer may still be used, for example, if the interfering event doesn't occur again or is no longer relevant. The routine rule layer(s) for controlling one or more devices associated with a user may therefore be personalized to the user. A control hub for modifying a rule may use compute resources (e.g., storage and/or processing) in order to generate and/or store an additional routine rule layer. Storing the additional routine rule layer (e.g., in persistent, non-volatile, storage of the control hub) may reduce the need to duplicate processing effort used to create the additional routine rule layer in the first place (e.g., if the same interfering event occurs again). The personalization of the routine rule layer(s) at a control hub may reduce unnecessary processing and/or storage of additional routine rule layers in a network comprising a plurality of control hubs (e.g., instead of deploying a single set of rules for all users in the network). In some cases, there may be a reduced need to temporarily store data relating to rules in volatile storage (e.g., random access memory) of a control hub, thus freeing up memory resources for other tasks at the control hub. In some cases, a rule layer structure comprising a base routine rule layer and an additional routine rule layer may be computationally simple to implement and use. For example, one of the base and additional routine rule layers may be selected and executed (e.g., to cause the one or more devices to be controlled according to the selected routine rule layer), instead of having to implement a single large, complex, set of rules in order to control one or more devices. In some cases, the separation of the rules into routine rule layers may facilitate rapid access to, processing and implementation of individual routine rule layers (e.g., instead of having to execute an entire rule set). In some cases, unused or irrelevant routine rule layers may be deleted to free up memory on the control hub. The layered structure of the rules may reduce the need to replace the entire set of rules with a new set of rules when a change occurs (e.g., occurrence of an interfering event or lack of occurrence of an interfering event) since individual routine rule layers may be deleted without affecting other routine rule layers.

BRIEF DESCRIPTION OF THE DRAWINGS

Exemplary embodiments will now be described, by way of example only, with reference to the following drawings, in which.

DETAILED DESCRIPTION OF THE EMBODIMENTS

As noted above, there is provided an improved method for modifying a stored rule at a control hub, and the control hub which address the existing problems. It will be appreciated that although the description below involves examples pertaining to electric toothbrushes and electric shavers, the described method and control hub are applicable to other types of devices and apparatuses, such as personal grooming devices, cooking appliances, entertainment devices, etc. It will be appreciated how additional rule layer(s) can be generated for these other types of devices for usage scenarios associated with a user's routine. Moreover, although the description below involves examples pertaining to voice control, it will be appreciated that the described method and control hub are applicable in scenarios where other types of control are used, e.g., screen interactions, etc.

Figure 1:
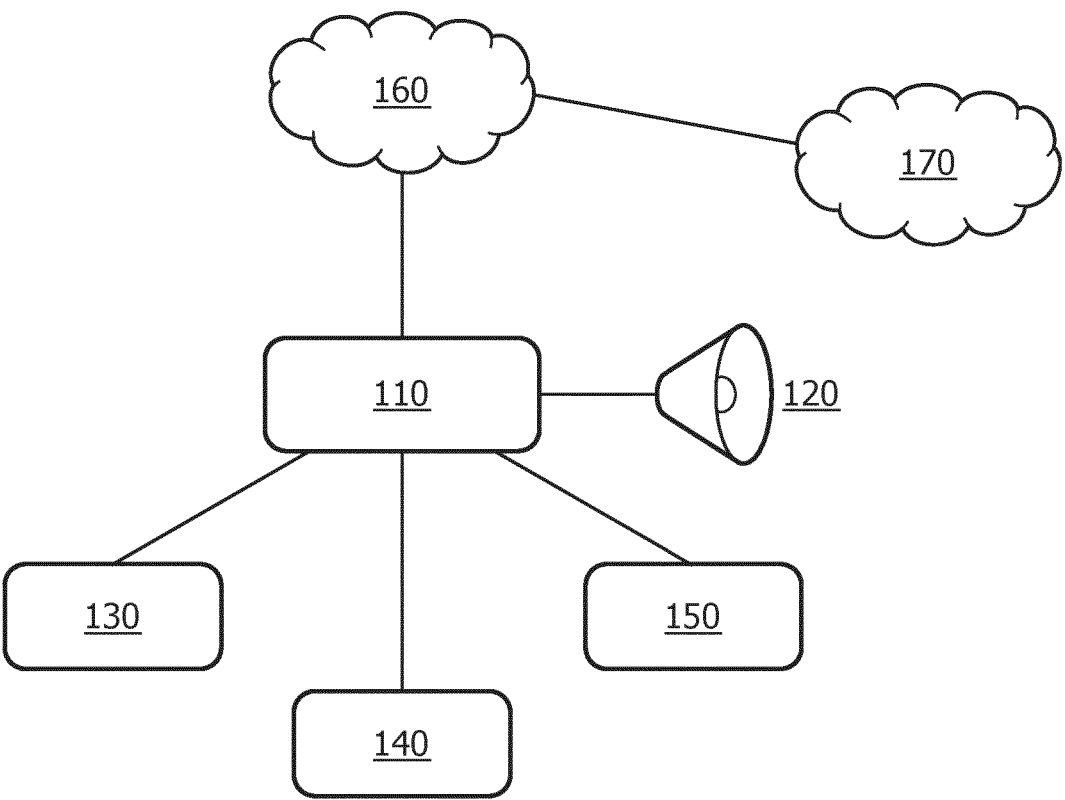
FIG. 1 is a schematic diagram of a hub system.
Figure 2:
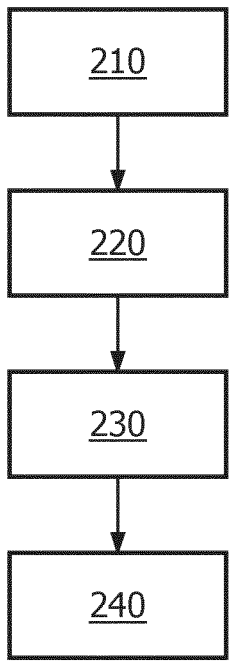
FIG. 2 is a flowchart illustrating a method for modifying a rule at a control hub according to an embodiment of the present disclosure.

FIG. 2 is a flowchart illustrating a method for modifying a rule at a control hub according to an embodiment of the present disclosure. The control hub is connected to one or more devices. The one or more devices may comprise one or more of: an electric toothbrush, an electric shaver, an oral cleaning device, an interdental device, a haircare device, a hair removal device, a skincare device, a body grooming device, an epilator device, an intense pulse light (IPL) device, and a body trimming device. The one or more devices may also comprise non-personal devices such as light fixtures (e.g., ceiling lights mirror lights, etc.) in a home environment of a user. Furthermore, the control hub is configured to deliver at least one of audio information and visual information, for example via an auxiliary device (e.g., a connected tablet) or a user interface at the control hub. The control hub may be a voice-assisted (or sometimes referred to as "voice-controlled") control hub.

The method begins at step 210 at which a base routine rule layer for controlling the one or more devices in a usage scenario is acquired. The base routine rule layer is based on historical data associated with a routine of a user. In some embodiments, acquiring the base routine rule layer at step 210 may comprise: acquiring the historical data associated with the routine of the user at the at least one of the one or more devices, and generating the base routine rule layer based on the acquired historical data.

The historical data associated with the routine of the user may be derived or acquired from one or more sources, such as from a memory or a cloud storage storing data of parameters as detected by sensors or sensing mechanisms at the one or more devices during one or more previous sessions (e.g., previous treatment sessions or previous grooming sessions), or during one or more previous parts of a current session. The historical data may include, in addition or alternatively, usage data detected/obtained for the same specific user when handling other device(s) (i.e., devices not directly used during the routine) such as device(s) within the same application category. For example, if the routine involves the use of an electric toothbrush, (historical) usage data obtained for the same user at an interdental device may be acquired as historical data for the purpose of generating the base routine rule layer. The historical data may include, in addition or alternatively, (average) usage data detected/obtained for one or more other users when handling the device(s) associated with the routine and/or device(s) within the same application category.

The historical data may include, in addition or alternatively, situational data such as data associated with physiological conditions such as a beard length of the user, data associated with oral health of the user, data associated with a skin condition of the user, data associated with climatic conditions (e.g., air humidity), and comparison data associated with handling patterns of the user at a device (e.g., with labelled patterns for device stroke movement).

Returning to FIG. 2, at step 220, at least one of sensor data and device data is acquired from at least one of the one or more devices. In some embodiments, the sensor data and/or device data may be acquired in real time, i.e., for the immediate determination of an interfering event at the next step and subsequently generation of a new additional rule layer, as explained in more detail below.

The sensor data may comprise at least one of: timer data of a device, motion sensor data of a device, accelerometer data of a device, rotation sensor data of a device, angle sensor data of a device (e.g., indicative of a change in angle of an accessory of the device with respect to the user's face, or a change in angle of a handle of the device with respect to the user's face/hand/arm, etc.), battery level data of a device, pressure sensor (e.g., capacitive or resistive touch sensor. Hall sensor, or force sensor) data of a device (e.g., indicative of a force at which an accessory or a portion of the device is pressed against the user's skin or oral zone), stroke length sensor data of a device, stroke speed sensor data of a device, stroke density sensor data of a device (e.g., indicative of the number of strokes over a predetermined area of the body portion to be treated), touch sensor data of a device (e.g., indicative of contact of an accessory or a portion of the device with the skin of the user), pause sensor data of a device (e.g., indicative of pause(s) in a treatment session at the device), distance sensor data of a device (e.g., indicative of a distance of the device from a mirror), grip sensor data of a device (e.g., indicative of a change of grip of the user and movement pattern of the grip), hair density sensor data of a device, hair length sensor data of a device, environmental sensor data of a device (e.g., indicative of air humidity level, skin moisture level, air temperature level, etc.), displacement sensor data of a device (e.g., indicative of a linear and/or rotatory displacement of an accessory of the device relative to the handle of the device), operation sensor data of a device (e.g., indicative of cutting/drive activity at the device), skin hydration sensor of a device, skin oiliness sensor of a device, skin pH sensor data of a device, pulse sensor data of a device, image sensor data of a device (e.g. indicative of a gesture of the user, or indicative of skin zone information, or indicative of stroke length and/or speed of the device, etc.), and attachment sensor data of a device (e.g., indicative of a type of attachment/accessory at the device, or usage of an attachment/accessory of the device, or the level of wear and tear of an attachment/accessory at the device). In some embodiments, the sensor data may be categorised by session or by routine. For example, detected pauses indicated by pause sensor data may be acquired on a per sessions basis.

The device data may comprise at least one of: a battery level status of a device, a remaining time for an action (e.g., brushing) corresponding to a device (or an accessory of the device), a cleanliness status of a device, a wear status of a device, usage statistics associated with an accessory of a device (e.g., linear and/or rotary movement quality metric for shaving or trimming), a revolutions per minute (RPM) at (an accessory of) a device, a torque level of a device, an operation mode or function of a device, a connectivity status of a device (e.g., "Bluetooth on/off"), a time spent on a body zone (e.g., face, oral zone, beard) of a device, and handling metrics of a device. In some embodiments, the device data may be categorised by session or by routine. For example, usage statistics associated with an accessory may be acquired on a per session basis.

Returning to FIG. 2, at step 230, it is determined whether there is an interfering event based on evaluation of the at least one of sensor data and device data, the interfering event being an event that conflicts with the base routine rule layer acquired at step 210.

For example, an interfering event may be that a detected pressure of an accessory of a device against a user's skin breaching a predetermined threshold thus conflicting with the use of a certain operation mode at a device. As another example, an interfering event may be that an unergonomic body position or movement is detected (e.g., via a motion sensor, or an accelerometer, or an image sensor) thus conflicting with the use of a certain device. As another example, an interfering event may be that the shaving behaviour between left and right halves of the face of the user is determined to differ (e.g., difference in pressure detected via a pressure sensor), thus conflicting with the use of a same operation mode on both halves of the face. As another example, an interfering event may be that a detected motion of use of a device does not satisfy a prerequisite movement pattern (e.g., moving the device in straight lines vs moving the device in circular/curved motions), thus conflicting with the sequence of usage of devices (i.e., the procedure deemed not being completed hence it is undesirable to move onto the next part of the routine).

Returning to FIG. 2, at step 240, an additional routine rule layer is generated upon determining that there is an interfering event, the additional routine rule layer being for controlling the one or more devices in the usage scenario when the interfering event occurs. The additional routine rule layer is generated based on the at least one of sensor data and device data.

In some embodiments where the control hub is connected to a plurality of devices (e.g., including an electric toothbrush and an electric shaver), the base routine layer may dictate a first relative priority of usage of at least a subset of the plurality of devices, and the additional routine rule layer may dictate a second relative priority of usage of at least the subset of the plurality of devices to accommodate or circumvent the interfering event. In these embodiments, the second relative priority is different from the first relative priority.

To illustrate this with an example, at step 210 it can be derived from the historical data associated with a routine of the user, as the base routine rule layer, that the user's usual routine involves using the electric toothbrush before the electric shaver. Accordingly, in this example, the first relative priority of usage (as dictated by the base routine rule layer) prioritises the electric toothbrush before the electric shaver. Then, at steps 220 and 230 the control hub may determine from sensor data and/or device data (e.g., battery level data/status) that the current battery level of the electric toothbrush is too low to operate. That is, the interfering event in this example is that the current battery level of the electric toothbrush is lower than a predetermined threshold. As such, at step 240 an additional routine rule layer may be generated to dictate a different relative priority of usage to prioritise the use of the electric shaver before the electric toothbrush when this interfering event occurs, so as to allow time for the electric toothbrush to be recharged before usage.

In some embodiments where the control hub is connected to a plurality of devices (e.g., including an electric trimmer and an electric razor), the base routine rule layer may dictate a first device of the plurality of devices for use in the usage scenario, and the additional routine rule layer may dictate a second device of the plurality of devices for use in the usage scenario to accommodate or circumvent the interfering event. In these embodiments, the second device is different from the first device.

To illustrate this with an example, at step 210 it can be derived from the historical data associated with a routine of the user, as the base routine rule layer, that the user's usual routine involves using the electric trimmer to perform a beard trimming routine. Accordingly, in this example, the first device is the electric trimmer (as dictated by the base routine rule layer). Then, at steps 220 and 230 the control hub may determine from sensor data and/or device data (e.g., cleanliness status/level or wear status/level) that the electric trimmer is not suitable for use for the beard trimming procedure, for example because the electric trimmer requires cleaning and/or maintenance in order to function properly. That is, the interfering event in this example is that the current cleanliness/wear level is lower than a predetermined threshold. As such, at step 240 an additional routine rule layer may be generated to dictate a different device (with similar functionalities), e.g., the electric razor, to be used for the same procedure when this interfering event occurs, so as to allow the user to proceed with their routine with a different (suitable) device rather than using an unsuitable device that may cause operational issues or skin issues.

In some embodiments, the base routine rule layer may dictate a first operation mode at a device of the one or more devices for use in the usage scenario, and the additional routine rule layer may dictate a second operation mode at the device for use in the usage scenario to accommodate or circumvent the interfering event. In these embodiments, the second operation mode is different from the first operation mode.

To illustrate this with an example, at step 210 it can be derived from the historical data associated with a routine of the user, as the base routine rule layer, that the user's usual routine involves using a turbo mode at an electric shaver to perform a shaving routine. Accordingly, in this example, the first operation mode is the turbo mode (as dictated by the base routine rule layer). Then, at steps 220 and 230 the control hub may determine from sensor data and/or device data (e.g., skin hydration sensor data and skin oiliness sensor data) that the turbo mode is not suitable for the user's current skin health metrics as it may cause skin redness and dryness. That is, the interfering event in this example is that the skin health level (as indicated by at least one of a skin hydration level and skin oiliness level) of the user breaching respective predetermined threshold(s). As such, at step 240 an additional routine rule layer may be generated to dictate a different (e.g., default) operation mode to be initiated at the electric shaver for the shaving procedure when this interfering event occurs, so as to avoid causing any damage to the user's skin during the shaving procedure.

Although not illustrated in FIG. 2, in some embodiments the method may further comprise, subsequent to generating the additional routine rule layer at step 240, executing the additional rule layer and storing the additional routine rule layer in a rule database (which may already store the base routine rule layer) at the control hub. For example, the additional rule layer may be stored such that it is associated with the specific usage scenario and/or the user routine. The additional routine rule layer may be stored as a layer in addition to the base routine rule layer, as both layers are associated with the same usage scenario and/or user routine.

Thus, the generation of the additional routine rule layer may mean that new "rules" or "rule layers" may be created e.g., by engaging the user in real time and evaluating the system parameters at play. These rules may therefore be determined and generated via the sensor data at hand, executed during a real time situation and stored in the rule database. This approach may reduce user effort and lead to reduced computational effort/cost for the control hub the next time the same situation plays out. Further, this approach may seek to handle the deviations in the overall device/sensor ecosystem by creating new rules e.g., with user approval. Since deviations may be recognised by event triggers, the corresponding rules will only be invoked when needed, which may be considered to reduce usage of computational resources compared with modifying or changing individual rules or complex rule systems.

In some cases, a user of one or more devices may have a routine which means that the base routine rule layer always applies. However, another user of one or more devices may be associated with an interfering event, thereby resulting in an additional routine rule layer being generated for this user. The additional routine rule layer may improve personalization to the user. However, the base routine rule layer may still be used, for example, if the interfering event doesn't occur again or is no longer relevant. The routine rule layer(s) for controlling one or more devices associated with a user may therefore be personalized to the user. The control hub may use compute resources (e.g., storage and/or processing) in order to generate and/or store an additional routine rule layer. Storing the additional routine rule layer (e.g., in persistent, non-volatile, storage of the control hub) may reduce the need to duplicate processing effort used to create the additional routine rule layer in the first place (e.g., if the same interfering event occurs again). The personalization of the routine rule layer(s) at the control hub may reduce unnecessary processing and/or storage of additional routine rule layers in a network comprising a plurality of control hubs (e.g., instead of deploying a single set of rules for all users in the network). In some cases, there may be a reduced need to temporarily store data relating to rules in volatile storage (e.g., random access memory) of a control hub, thus freeing up memory resources for other tasks at the control hub.

In these embodiments, the method may further comprise the step of acquiring a user interaction to confirm acceptance of the additional routine rule layer. For example, the control hub may be configured to output an audio file such as "do you wish to accept the alternative option?" or utterances more specific to the additional routine rule layer, the usage scenario, and/or the user routine, and to receive a voice instruction such as "yes" or "accept" from the user. In these embodiments, the execution of the additional routine rule layer and the storage of the additional routine rule layer in the rule database may only be performed upon acquiring the user interaction to confirm acceptance of the additional routine rule layer.

It will be appreciated that although the steps in the method illustrated in FIG. 2 have been described as being performed sequentially, in some embodiments at least some of the steps in the illustrated method may be performed in a different order, and/or at least some of the steps in the illustrated method may be performed simultaneously. Moreover, in some embodiments the methods illustrated in FIG. 2 may be performed multiple times to generate multiple additional routine rule layers (either with respect to the same base routine rule layer or with respect to different base routine rule layers).

Figure 3:
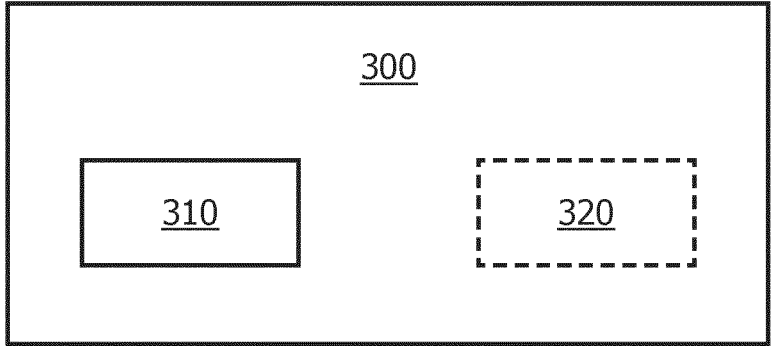
FIG. 3 is a block diagram illustrating a control hub according to an embodiment of the present disclosure.

Any appropriate steps, methods, or functions may be performed through a computer program product that may, for example, be executed by the components and equipment illustrated in the FIG. 3. The computer program may include instructions which cause processing circuitry (and/or any operatively coupled entities and devices) to execute methods according to embodiments described herein. The computer program and/or computer program product may thus provide means for performing any steps herein disclosed.

FIG. 3 is a block diagram illustrating a control hub according to an embodiment of the present disclosure. The control hub 300 is connected to one or more devices (not shown in the diagram), such as one or more of an electric toothbrush, an electric shaver, an oral cleaning device, an interdental device, a haircare device, a hair removal device, a skincare device, a body grooming device, an epilator device, an intense pulse light (IPL) device, and a body trimming device. The control hub 300 comprises processing circuitry 310 and optionally a memory 320. The processing circuitry 310 is configured to deliver at least one of audio information and visual information, for example via an auxiliary device (e.g., a connected tablet) or a user interface at the control hub 300. In some embodiments, the control hub may be a voice-assisted (or sometimes referred to as "voice-controlled") control hub.

Furthermore, the processing circuitry 310 is configured to acquire a base routine rule layer for controlling the one or more devices in a usage scenario. The base routine rule layer is based on historical data associated with a routine of a user. In some embodiments, the processing circuitry 310 may be configured to acquire the base routine rule layer by acquiring the historical data associated with the routine of the user at the at least one of the one or more devices and generating the base routine rule layer based on the acquired historical data.

The historical data associated with the routine of the user may be derived or acquired from one or more sources, such as from a memory or a cloud storage storing data of parameters as detected by sensors or sensing mechanisms at the one or more devices during one or more previous sessions (e.g., previous treatment sessions or previous grooming sessions), or during one or more previous parts of a current session. The historical data may include, in addition or alternatively, usage data detected/obtained for the same specific user when handling other device(s) (i.e., devices not directly used during the routine) such as device(s) within the same application category. For example, if the routine involves the use of an electric toothbrush, (historical) usage data obtained for the same user at an interdental device may be acquired as historical data for the purpose of generating the base routine rule layer. The historical data may include, in addition or alternatively, (average) usage data detected/obtained for one or more other users when handling the device(s) associated with the routine and/or device(s) within the same application category.

The historical data may include, in addition or alternatively, situational data such as data associated with physiological conditions such as a beard length of the user, data associated with oral health of the user, data associated with a skin condition of the user, data associated with climatic conditions (e.g., air humidity), and comparison data associated with handling patterns of the user at a device (e.g., with labelled patterns for device stroke movement).

The processing circuitry 310 is further configured to acquire at least one of sensor data and device data from at least one of the one or more devices. In some embodiments, the sensor data and/or device data may be acquired in real time, i.e., for the immediate determination of an interfering event at the next step and subsequently generation of a new additional rule layer, as explained in more detail below.

The sensor data may comprise at least one of: timer data of a device, motion sensor data of a device, accelerometer data of a device, rotation sensor data of a device, angle sensor data of a device, battery level data of a device, pressure sensor data of a device, stroke length sensor data of a device, stroke speed sensor data of a device, stroke density sensor data of a device, touch sensor data of a device, pause sensor data of a device, distance sensor data of a device, grip sensor data of a device, hair density sensor data of a device, hair length sensor data of a device, environmental sensor data of a device, displacement sensor data of a device, operation sensor data of a device, skin hydration sensor of a device, skin oiliness sensor of a device, skin pH sensor data of a device, pulse sensor data of a device, image sensor data of a device, and attachment sensor data of a device. In some embodiments, the sensor data may be categorised by session or by routine. For example, detected pauses indicated by pause sensor data may be acquired on a per sessions basis.

The device data may comprise at least one of: a battery level status of a device, a remaining time for an action corresponding to a device (or an accessory of the device), a cleanliness status of a device, a wear status of a device, usage statistics associated with an accessory of a device a revolutions per minute (RPM) at (an accessory of) a device, a torque level of a device, an operation mode or function of a device, a connectivity status of a device, a time spent on a body zone of a device, and handling metrics of a device. In some embodiments, the device data may be categorised by session or by routine. For example, usage statistics associated with an accessory may be acquired on a per session basis.

The processing circuitry 310 is configured to determine whether there is an interfering event based on evaluation of the at least one of sensor data and device data, the interfering event being an event that conflicts with the base routine rule layer, and to generate an additional routine rule layer upon determining that there is an interfering event. The additional routine rule layer is for controlling the one or more devices in the usage scenario when the interfering event occurs, and is generated based on the at least one of sensor data and device data.

In some embodiments where the control hub is connected to a plurality of devices (e.g., including an electric toothbrush and an electric shaver), the base routine layer may dictate a first relative priority of usage of at least a subset of the plurality of devices, and the additional routine rule layer may dictate a second relative priority of usage of at least the subset of the plurality of devices to accommodate or circumvent the interfering event. In these embodiments, the second relative priority is different from the first relative priority.

In some embodiments where the control hub is connected to a plurality of devices (e.g., including an electric trimmer and an electric razor), the base routine rule layer may dictate a first device of the plurality of devices for use in the usage scenario, and the additional routine rule layer may dictate a second device of the plurality of devices for use in the usage scenario to accommodate or circumvent the interfering event. In these embodiments, the second device is different from the first device.

In some embodiments, the base routine rule layer may dictate a first operation mode at a device of the one or more devices for use in the usage scenario, and the additional routine rule layer may dictate a second operation mode at the device for use in the usage scenario to accommodate or circumvent the interfering event. In these embodiments, the second operation mode is different from the first operation mode.

In some embodiments the processing circuitry 310 may be configured to, subsequent to generating the additional routine rule layer, execute the additional rule layer and store the additional routine rule layer in a rule database at the control hub. For example, the additional rule layer may be stored such that it is associated with the specific usage scenario and/or the user routine. The additional routine rule layer may be stored as a layer in addition to the base routine rule layer, as both layers are associated with the same usage scenario and/or user routine.

In some embodiments, the processing circuitry 310 may be configured to determine whether or not additionally acquired sensor data and/or device data is indicative of an occurrence of the interfering event subsequent to generating the additional routine rule layer.

In this regard, the processing circuitry 310 may be configured to select, from the rule database, the base routine rule layer in response to a determination being made, based on the additionally acquired sensor data and/or device data, that the interfering event has not occurred subsequent to generating the additional routine rule layer.

On the other hand, the processing circuitry 310 may be configured to select, from the rule database, the additional routine rule layer in response to a determination being made, based on the additionally acquired sensor data and/or device data, that the interfering event has occurred subsequent to generating the additional routine rule layer Depending on which routine rule layer is selected, the processing circuitry 310 may be configured to instruct the "selected" base or additional routine rule layer to be executed, to control the one or more devices according to the selected base or additional routine rule layer.

In some cases, a rule layer structure comprising a base routine rule layer and an additional routine rule layer may be computationally simple to implement and use. For example, one of the base and additional routine rule layers may be selected and executed (e.g., to cause the one or more devices to be controlled according to the selected routine rule layer), instead of having to implement a single large, complex, set of rules in order to control one or more devices. In some cases, the separation of the rules into routine rule layers may facilitate rapid access to, processing and implementation of individual routine rule layers (e.g., instead of having to execute an entire rule set).

In some embodiments, subsequent to generating the additional routine rule layer, the processing circuitry 310 may be configured to determine whether or not the additional routine rule layer still applies based on whether or not the interfering event occurs within a specified period of time. The processing circuitry 310 may be further configured to delete the additional routine rule layer from the rule database in response to determining that the interfering event has not occurred within the specified period of time.

In some cases, unused or irrelevant routine rule layers may be deleted (e.g., after the specified period of time) to free up memory on the control hub. The layered structure of the rules may reduce the need to replace the entire set of rules with a new set of rules when a change occurs (e.g., occurrence of an interfering event or lack of occurrence of an interfering event) since individual routine rule layers may be deleted without affecting other routine rule layers.

In any of these embodiments, the processing circuitry 310 may be further configured to acquire a user interaction to confirm acceptance of the additional routine rule layer. For example, the control hub may be configured to output an audio file such as "do you wish to accept the alternative option?" or utterances more specific to the additional routine rule layer, the usage scenario, and/or the user routine, and to receive a voice instruction such as "yes" or "accept" from the user. In these embodiments, the execution of the additional routine rule layer and the storage of the additional routine rule layer in the rule database may only be performed by the processing circuitry 310 upon acquiring the user interaction to confirm acceptance of the additional routine rule layer.

It will be appreciated that FIG. 3 only shows the components required to illustrate an aspect of the control hub 300 and, in a practical implementation, the control hub 300 may comprise alternative or additional components to those shown.

For example, in some embodiments the control hub 30 may further comprise a power source and/or a user interface. The user interface may be for use in providing a user of the control hub 300 with information resulting from the technique described herein. Alternatively or in addition, the user interface may be configured to receive a user input. For example, the user interface may allow a user of the control hub 300 to confirm acceptance of an additional routine rule layer. The user interface may be any user interface that enables the rendering (or output or display) of information to a user of the control hub 300. Alternatively or in addition, the user interface may be any user interface that enables a user of the control hub 300 to provide a user input, interact with and/or control the control hub 300. For example, the user interface may comprise one or more switches, one or more buttons, a keypad, a keyboard, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces.

Figure 4:
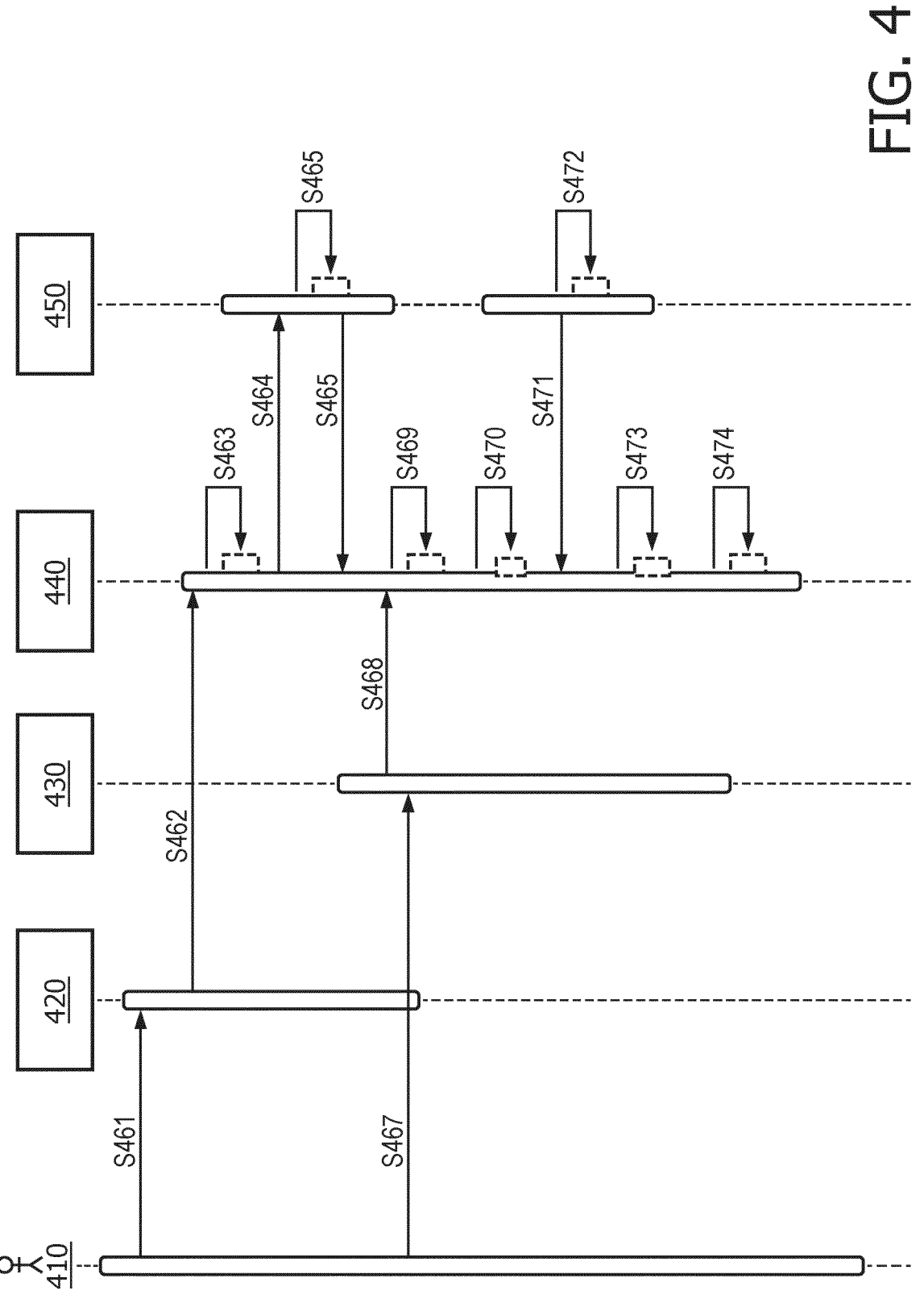
FIG. 4 is a sequence diagram illustrating an example of rule modification according to an embodiment of the present disclosure.

FIG. 4 is a sequence diagram illustrating an example of rule modification according to an embodiment of the present disclosure. In this example, there is provided a user 410, an electric toothbrush 420, an electric shaver 430, a voice-assisted hub 440, and a digital platform 450. The voice-assisted hub 440 and the digital platform 450 may be collectively regarded as a singular control hub (such as the control hub 300 described with reference to FIG. 3 above).

The method in this example begins at step S461 at which the user 410 interacts with the electric toothbrush 420, for example picking it up in preparation for a brushing session. Then, at step S462, the electric toothbrush 420 (which is connected to the voice-assisted hub 440), which is awaken from a sleep mode trigged by the picking up action by the user 410, sends a notification to the voice-assisted hub 440 which may include sensor data and/or device data (e.g., usage statistics of the electric toothbrush 420).

Subsequently, at steps S463 and S464, the voice-assisted hub 440 determines whether an interfering event has occurred based on the notification received from the electric toothbrush 420 (the interfering event conflicted with a stored base routine rule layer at the digital platform 450), and sends information associated with the interfering event to the digital platform 450 upon determining that an interfering event has occurred. The digital platform 450 then determines at step S465 an additional routine rule layer based on stored settings (which may include user profile preferences such as a tone of voice to use at the voice-assisted hub, etc.) and the sensor/device data, and sends at step S466 a first corresponding audio file to the voice-assisted hub 440 to be output, the first corresponding audio file being an audio file that corresponds to a response to be provided to the user 410 based on a current situation (e.g., of the electric toothbrush or of the bathroom environment).

Then, step S467 the user 410 interacts with the electric shaver 430, for example using it in a shaving session. At step S468 the electric shaver 430 (which is connected to the voice-assisted hub 440) sends a notification to the voice-assisted hub 440 which may include sensor data and/or device data (e.g., usage statistics of the electric shaver 430).

Similarly, at step S469, the voice-assisted hub 440 determines whether an interfering event has occurred based on the notification received from the electric shaver 430 (the interfering event conflicted with a stored base routine rule layer at the digital platform 450). At step S470, the voice-assisted hub monitors connected devices and provide real-time feedback (e.g., retrieving an audio file to state that "you are pressing too hard" if a detected pressure at a device is above a predetermined threshold). Then, at step 471, the voice-assisted hub 440 sends information associated with the interfering event to the digital platform 450 upon determining that an interfering event has occurred. The digital platform 450 then determines at step S472 an additional routine rule layer based on stored settings (which may include user profile preferences such as a tone of voice to use at the voice-assisted hub, etc.) and the sensor/device data, and sends at step S473 a second corresponding audio file to the voice-assisted hub 440 to be output, the second corresponding audio file being an audio file that corresponds to a response to be provided to the user based on a current situation.

In this example, the additional routine rule layer(s) determined at S465 and/or S472 may dictate a priority of usage of devices and accordingly the priority of outputting audio files corresponding to those devices. Therefore, at step S474, the audio file determined as having a higher priority is output at the voice-assisted hub 440, and subsequently at step S475 the audio file determined as having a lower priority is output at the voice-assisted hub 440.

Figure 5:
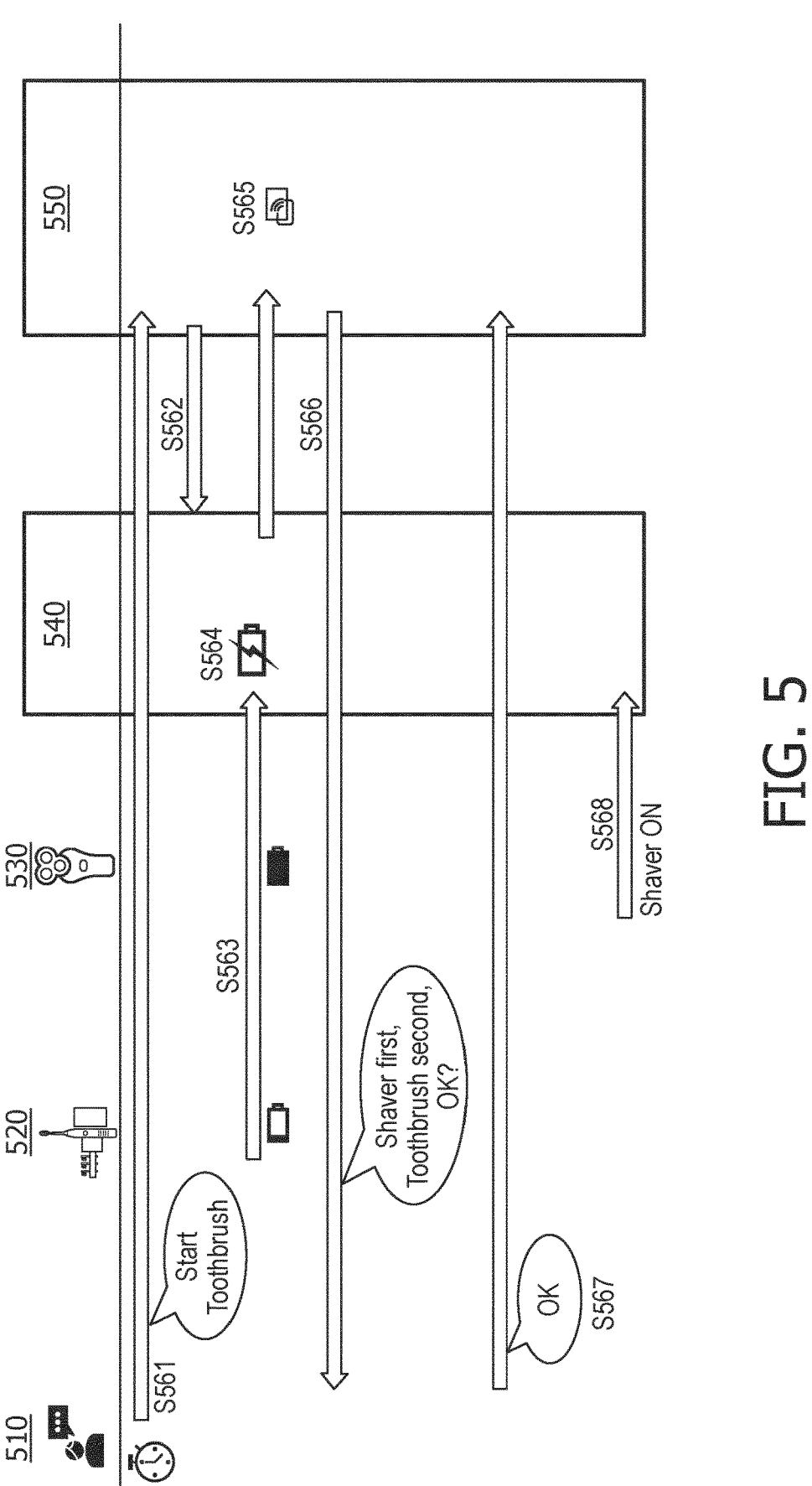
FIG. 5 is a sequence diagram illustrating an example of rule modification according to an embodiment of the present disclosure.

FIG. 5 is a sequence diagram illustrating an example of rule modification according to an embodiment of the present disclosure. In this example, there is provided a user 510, an electric toothbrush 520, an electric shaver 530, and a control hub represented by a hub component 540 and a voice-assistant component 550.

The exemplary method begins at step S561 at which the user 510 initiates a routine by uttering the instruction "start toothbrush". This instruction is received by the voice-assistant component 550 of the control hub which then invokes at step S562 a stored base routine rule layer, which dictates the use of the electric toothbrush 520 first before the use of the electric shaver 530 in the user's usual routine. Then, at step S563 the hub component 540 receives battery level data from both the electric toothbrush 520 and the electric shaver 530, and analyses the battery level at step S564 to determine at step S565 an interfering event that conflicts with the base routine rule layer, i.e., that the current battery level at the electric toothbrush 520 is too low to operate and thus it is not possible to use it before using the electric shaver 530.

The voice-assistant component 550 then generates an additional routine rule layer ("when battery level is low for a routine, change device usage order based on measured parameter(s)") based on sensor and/or device data of the electric toothbrush 520 and/or the electric shaver 530, and requests at step S566 confirmation from the user 510 of the additional routine rule layer by outputting the audio information: "shaver first, toothbrush second. OK?". Once the voice-assistant component 550 receives the confirmation at step S567 (i.e., the user saying "OK"), it invokes the additional routine rule layer by switching on the electric shaver 530 at step S568.

Figure 6:
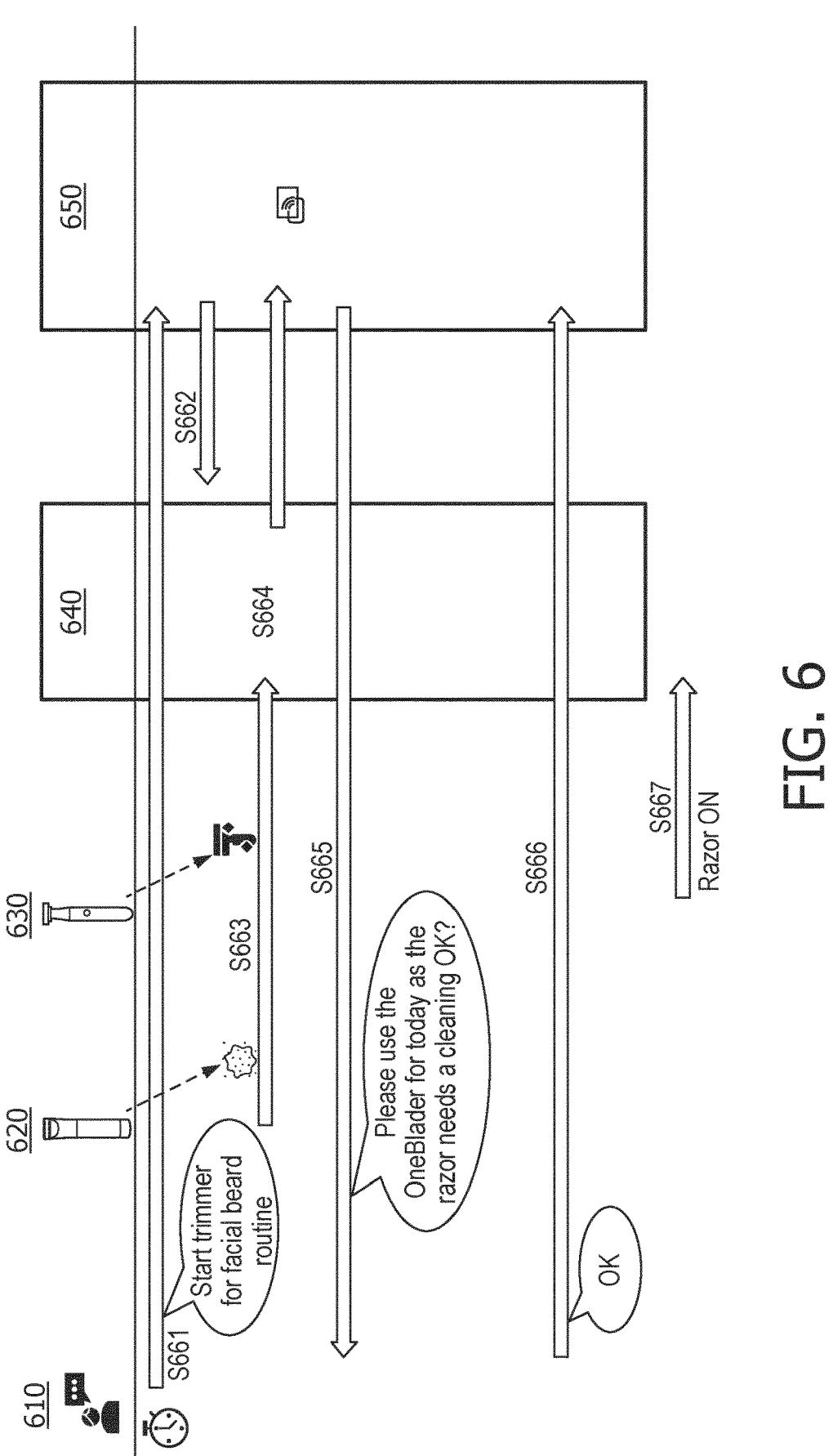
FIG. 6 is a sequence diagram illustrating an example of rule modification according to an embodiment of the present disclosure.

FIG. 6 is a sequence diagram illustrating an example of rule modification according to an embodiment of the present disclosure. In this example, there is provided a user 610, an electric trimmer 620, an electric razor 630, and a control hub represented by a hub component 640 and voice-assistant component 650.

The exemplary method begins at step S661 at which the user 610 initiates a routine by uttering the instruction "start trimmer for facial beard routine". This instruction is received by the voice-assistant component 650 of the control hub which then invokes at step S662 a stored base routine rule layer, which dictates the use of the electric trimmer 620 in the user's usual routine for facial beard grooming. Then, at step S663 the hub component 640 receives cleanliness level data and wear level data from both the electric trimmer 620 and the electric razor 630, and analyses the cleanliness level data and wear level data at step S664 to determine an interfering event that conflicts with the base routine rule layer, i.e., that the wear level and/or the cleanliness level at the electric trimmer 620 has breached a predetermined threshold and the electric trimmer 620 requires maintenance or cleaning, and thus it is not possible to use it for facial beard trimming.

The voice-assistant component 650 then generates an additional routine rule layer ("when wear level and/or cleanliness level breaches a predetermined threshold, use alternative device based on measured parameter(s)") based on sensor and/or device data of the electric trimmer 620 and/or the electric razor 630, and requests at step S665 confirmation from the user 610 of the additional routine rule layer by outputting the audio information: "Please use the electric razor as the electric trimmer requires cleaning and maintenance. OK?". Once the voice-assistant component 650 receives the confirmation at step S666 (i.e., the user saying "OK"), it invokes the additional routine rule layer by switching on the electric razor 630 at step S667.

Figure 7:
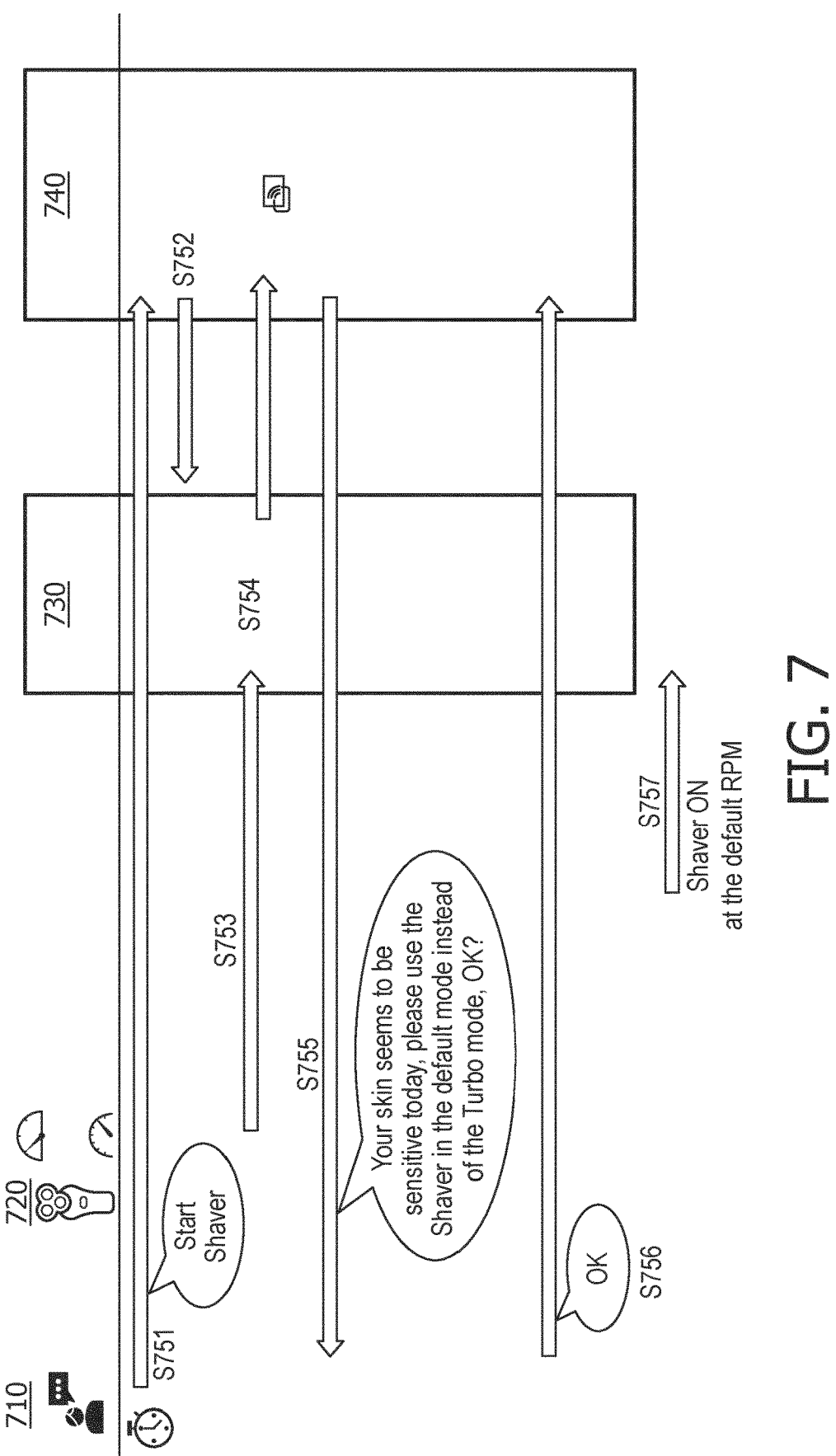
FIG. 7 is a sequence diagram illustrating an example of rule modification according to an embodiment of the present disclosure.

FIG. 7 is a sequence diagram illustrating an example of rule modification according to an embodiment of the present disclosure. In this example, there is provided a user 710, an electric shaver 720 and a control hub represented by a hub component 730 and voice-assistant component 740.

The exemplary method begins at step S751 at which the user 710 initiates a routine by uttering the instruction "start shaver". This instruction is received by the voice-assistant component 740 of the control hub which then invokes at step S752 a stored base routine rule layer, which dictates the use of a turbo mode at the electric shaver 720 for the user's usual routine shaving session. Then, at step S753 the hub component 730 receives skin hydration level data, and/or skin oiliness level data, and/or conductance sensor data from the electric shaver 720, and analyses skin health metrics based on the received data at step S754 to determine an interfering event that conflicts with the base routine rule layer, i.e., that the turbo mode is not suitable for the current skin health metrics of the user, and using turbo mode may cause damage of the user's skin.

The voice-assistant component 740 then generates an additional routine rule layer ("when skin health metrics of the user indicates that their skin in a sensitive state, use default mode at the shaver based on measured parameter(s)") based on sensor and/or device data of the electric shaver 720, and requests at step S755 confirmation from the user 710 of the additional routine rule layer by outputting the audio information: "Your skin seems to be sensitive today, please use the shaver in the default mode instead of the turbo mode, OK?". Once the voice-assistant component 740 receives the confirmation at step S756 (i.e., the user saying "OK"), it invokes the additional routine rule layer by switching on the electric shaver 720 in the default mode at step S757.

The disclosure includes the subject-matter as defined by the following numbered paragraphs.

Paragraph 1. A computer-implemented method for modifying a rule at a control hub, wherein the control hub is connected to one or more devices and is configured to deliver at least one of audio information and visual information, the method comprising:

acquiring a base routine rule layer for controlling the one or more devices in a usage scenario, wherein the base routine rule layer is based on historical data associated with a routine of a user;

acquiring at least one of sensor data and device data from at least one of the one or more devices;

determining whether there is an interfering event based on evaluation of the at least one of sensor data and device data, wherein the interfering event conflicts with the base routine rule layer; and generating, upon determining that there is an interfering event, an additional routine rule layer based on the at least one of sensor data and device data, wherein the additional routine rule layer is for controlling the one or more devices in the usage scenario when the interfering event occurs.

Paragraph 2. The method according to paragraph 1, wherein acquiring the base routine rule layer for controlling the one or more devices comprises:

acquiring the historical data associated with the routine of the user at the at least one of the one or more devices; and generating the base routine rule layer based on the acquired historical data.

Paragraph 3. The method according to paragraph 1 or paragraph 2, further comprising, subsequent to generating the additional routine rule layer:

executing the additional routine rule layer; and storing the additional routine rule layer in a rule database at the control hub.

Paragraph 4. The method according to paragraph 3, further comprising acquiring a user interaction to confirm acceptance of the additional routine rule layer, wherein the step of executing the additional routine rule layer and storing the additional routine rule layer are only performed upon acquiring the user interaction to confirm acceptance of the additional routine rule layer.

Paragraph 5. The method according to any one of the preceding paragraphs, wherein the control hub is connected to a plurality of devices, and wherein the base routine rule layer dictates a first relative priority of usage of at least a subset of the plurality of devices, and the additional routine rule layer dictates a second relative priority of usage of at least the subset of the plurality of devices to accommodate or circumvent the interfering event, wherein the second relative priority of usage is different from the first relative priority of usage.

Paragraph 6. The method according to any one of paragraphs 1 to 4, wherein the control hub is connected to a plurality of devices, wherein the base routine rule layer dictates a first device of the plurality of devices for use in the usage scenario, and the additional routine rule layer dictates a second device of the plurality of devices for use in the usage scenario to accommodate or circumvent the interfering event, wherein the second device is different from the first device.

Paragraph 7. The method according to any one of paragraphs 1 to 4, wherein the base routine rule layer dictates a first operation mode at a device of the one or more devices for use in the usage scenario, and the additional routine rule layer dictates a second operation mode at the device for use in the usage scenario to accommodate or circumvent the interfering event, wherein the second operation mode is different from the first operation mode.

Paragraph 8. The method according to any one of the preceding paragraphs, wherein the sensor data comprises at least one of: time data of a device, motion sensor data of a device, accelerometer data of a device, rotation sensor data of a device, angle sensor data of a device, battery level data of a device, pressure sensor data of a device, stroke length sensor data of a device, stroke speed sensor data of a device, stroke density sensor of a device, touch sensor data of a device, pause sensor data of a device, distance sensor data of a device, grip sensor data of a device, hair density sensor data of a device, hair length sensor data of a device, environmental sensor data of a device, displacement sensor data of a device, operation sensor data of a device, skin hydration sensor of a device, skin oiliness sensor of a device, skin pH sensor data of a device, pulse sensor data of a device, image sensor data of a device, and attachment sensor data of a device.

Paragraph 9. The method according to any one of the preceding paragraphs, wherein the device data comprises at least one of: a battery level status of a device, a remaining time for an action corresponding to a device, a cleanliness status of a device, a wear status of a device, usage statistics associated with an accessory of a device, a revolutions per minute, RPM, at a device, a torque level of a device, an operation mode or function of a device, a connectivity status of a device, a time spent on a body zone of a device, and handling metrics of a device.

Paragraph 10. The method according to paragraph 8, wherein the sensor data comprises at least one of skin hydration sensor data of a device and a skin oiliness sensor data of a device, and wherein the interfering event is when a skin hydration level of the user or a skin oiliness level of the user breaches a predetermined threshold.

Paragraph 11. The method according to paragraph 8 or paragraph 9, wherein the sensor data comprises battery level data of a device and/or the device data comprises a battery level status of a device, and wherein the interfering event is when the battery level of the device is lower than a predetermined threshold, or when the battery level of the device is lower than that of another device connected to the control hub.

Paragraph 12. The method according to paragraph 9, wherein the device data comprises a cleanliness status of a device, and wherein the interfering event is when the cleanliness status of the device is lower than a predetermined threshold.

Paragraph 13. The method according to any one of the preceding paragraphs, wherein the one or more devices comprises one or more of: an electric toothbrush, an electric shaver, an oral cleaning device, an interdental device, a haircare device, a hair removal device, a skincare device, a body grooming device, an epilator device, an intense pulse light, IPL, device, and a body trimming device.

Paragraph 14. A computer program comprising a computer readable medium, the compute readable medium having computer readable code embodied therein, the computer readable code being configured such that, on execution by a suitable computer or processor, the computer or processor is caused to perform the method as in any one of paragraphs 1 to 13.

Paragraph 15. A control hub connected to one or more devices, the control hub comprising processing circuitry configured to deliver at least one of audio information and visual information, and to perform the following steps:

acquire a base routine rule layer for controlling the one or more devices in a usage scenario, wherein the base routine rule layer is based on historical data associated with a routine of a user;

acquire at least one of sensor data and device data from at least one of the one or more devices;

determine whether there is an interfering event based on evaluation of the at least one of sensor data and device data, wherein the interfering event conflicts with the base routine rule layer; and generate, upon determining that there is an interfering event, an additional routine rule layer based on the at least one of sensor data and device data, wherein the additional routine rule layer is for controlling the one or more devices in the usage scenario when the interfering event occurs.

As used herein, the expression "at least one of" followed by a recited set of elements or features refers to any number or combination of the recited set of elements or features. For example, where the expression "at least one of" is used, this may refer to "one of" or "a plurality of" the recited set of elements or features. In other words, for the recited set of elements/features: A, B and C, the expression "at least one of A, B and C" means "A, B, and/or C", and that it suffices if only B is present, for example.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method for modifying a rule at a control hub, wherein the control hub is connected to one or more devices and is configured to deliver at least one of audio information and visual information, the method comprising:

acquiring a base routine rule layer for controlling the one or more devices in a usage scenario, wherein the base routine rule layer is based on historical data associated with a routine of a user;

acquiring device-intrinsic sensor data and/or device data from at least one of the one or more devices, wherein the device-intrinsic sensor data and/or device data comprises at least one operating parameter of the device selected from the group consisting of battery level status, cleanliness status, and wear status;

determining whether there is an interfering event based on evaluation of the device-intrinsic sensor data and/or device data, wherein the interfering event comprises the at least one operating parameter breaching a predetermined threshold and wherein interfering event conflicts with the base routine rule layer;

generating, upon determining that there is an interfering event, an additional routine rule layer based on the device-intrinsic sensor data and/or device data, wherein the additional routine rule layer is for controlling the one or more devices in the usage scenario when the interfering event occurs;

executing the additional routine rule layer; and storing the additional routine rule layer in a rule database at the control hub.

2. The method according to claim 1, wherein acquiring the base routine rule layer for controlling the one or more devices comprises:

acquiring the historical data associated with the routine of the user at the at least one of the one or more devices; and generating the base routine rule layer based on the acquired historical data.

3. The method according to claim 1, comprising:

determining whether or not additionally acquired sensor data and/or device data is indicative of an occurrence of the interfering event subsequent to generating the additional routine rule layer;

selecting, from the rule database, the base routine rule layer in response to a determination being made, based on the additionally acquired sensor data and/or device data, that the interfering event has not occurred subsequent to generating the additional routine rule layer; or selecting, from the rule database, the additional routine rule layer in response to a determination being made, based on the additionally acquired sensor data and/or device data, that the interfering event has occurred subsequent to generating the additional routine rule layer; and instructing the selected base or additional routine rule layer to be executed, to control the one or more devices according to the selected base or additional routine rule layer.

4. The method according to claim 1, wherein subsequent to generating the additional routine rule layer, the method comprises:

determining whether or not the additional routine rule layer still applies based on whether or not the interfering event occurs within a specified period of time; and deleting the additional routine rule layer from the rule database in response to determining that the interfering event has not occurred within the specified period of time.

5. The method according to claim 1, further comprising acquiring a user interaction to confirm acceptance of the additional routine rule layer, wherein the step of executing the additional routine rule layer and storing the additional routine rule layer are only performed upon acquiring the user interaction to confirm acceptance of the additional routine rule layer.

6. The method according to claim 1, wherein the control hub is connected to a plurality of devices, and wherein the base routine rule layer dictates a first relative priority of usage of at least a subset of the plurality of devices, and the additional routine rule layer dictates a second relative priority of usage of at least the subset of the plurality of devices to accommodate or circumvent the interfering event, wherein the second relative priority of usage is different from the first relative priority of usage.

7. The method according to claim 1, wherein the control hub is connected to a plurality of devices, wherein the base routine rule layer dictates a first device of the plurality of devices for use in the usage scenario, and the additional routine rule layer dictates a second device of the plurality of devices for use in the usage scenario to accommodate or circumvent the interfering event, wherein the second device is different from the first device.

8. The method according to claim 1, wherein the base routine rule layer dictates a first operation mode at a device of the one or more devices for use in the usage scenario, and the additional routine rule layer dictates a second operation mode at the device for use in the usage scenario to accommodate or circumvent the interfering event, wherein the second operation mode is different from the first operation mode.

9. The method according to claim 1, wherein the sensor data comprises at least one of: time data of a device, motion sensor data of a device, accelerometer data of a device, rotation sensor data of a device, angle sensor data of a device, battery level data of a device, pressure sensor data of a device, stroke length sensor data of a device, stroke speed sensor data of a device, stroke density sensor of a device, touch sensor data of a device, pause sensor data of a device, distance sensor data of a device, grip sensor data of a device, hair density sensor data of a device, hair length sensor data of a device, environmental sensor data of a device, displacement sensor data of a device, operation sensor data of a device, skin hydration sensor of a device, skin oiliness sensor of a device, skin pH sensor data of a device, pulse sensor data of a device, image sensor data of a device, and attachment sensor data of a device.

10. The method according to claim 1, wherein the device data comprises at least one of: a battery level status of a device, a remaining time for an action corresponding to a device, a cleanliness status of a device, a wear status of a device, usage statistics associated with an accessory of a device, a revolutions per minute, RPM, at a device, a torque level of a device, an operation mode or function of a device, a connectivity status of a device, a time spent on a body zone of a device, and handling metrics of a device.

11. The method according to claim 9, wherein the sensor data comprises at least one of skin hydration sensor data of a device and a skin oiliness sensor data of a device, and wherein the interfering event is when a skin hydration level of the user or a skin oiliness level of the user breaches a predetermined threshold.

12. The method according to claim 9, wherein the sensor data comprises battery level data of a device and/or the device data comprises a battery level status of a device, and wherein the interfering event is when the battery level of the device is lower than a predetermined threshold, or when the battery level of the device is lower than that of another device connected to the control hub.

13. The method according to claim 10, wherein the device data comprises a cleanliness status of a device, and wherein the interfering event is when the cleanliness status of the device is lower than a predetermined threshold.

14. A computer program comprising a computer readable medium, the computer readable medium having computer readable code embodied therein, the computer readable code being configured such that, on execution by a suitable computer or processor, the computer or processor is caused to perform the method as claimed in claim 1.

15. A control hub connected to one or more devices, the control hub comprising processing circuitry configured to deliver at least one of audio information and visual information, and to perform the following steps:

acquire a base routine rule layer for controlling the one or more devices in a usage scenario, wherein the base routine rule layer is based on historical data associated with a routine of a user;

acquire device-intrinsic sensor data and/or device data from at least one of the one or more devices, wherein the device-intrinsic sensor data and/or device data comprises at least one operating parameter of the device selected from the group consisting of battery level status, cleanliness status, and wear status;

determine whether there is an interfering event based on evaluation of the device-intrinsic sensor data and/or device data, wherein the interfering event comprises the at least one operating parameter breaching a predetermined threshold and wherein the interfering event conflicts with the base routine rule layer;

generate, upon determining that there is an interfering event, an additional routine rule layer based on the device-intrinsic sensor data and/or device data, wherein the additional routine rule layer is for controlling the one or more devices in the usage scenario when the interfering event occurs;

execute the additional routine rule layer; and store the additional routine rule layer in a rule database at the control hub.

\* \* \* \* \*